Patented Sept. 13, 1927.

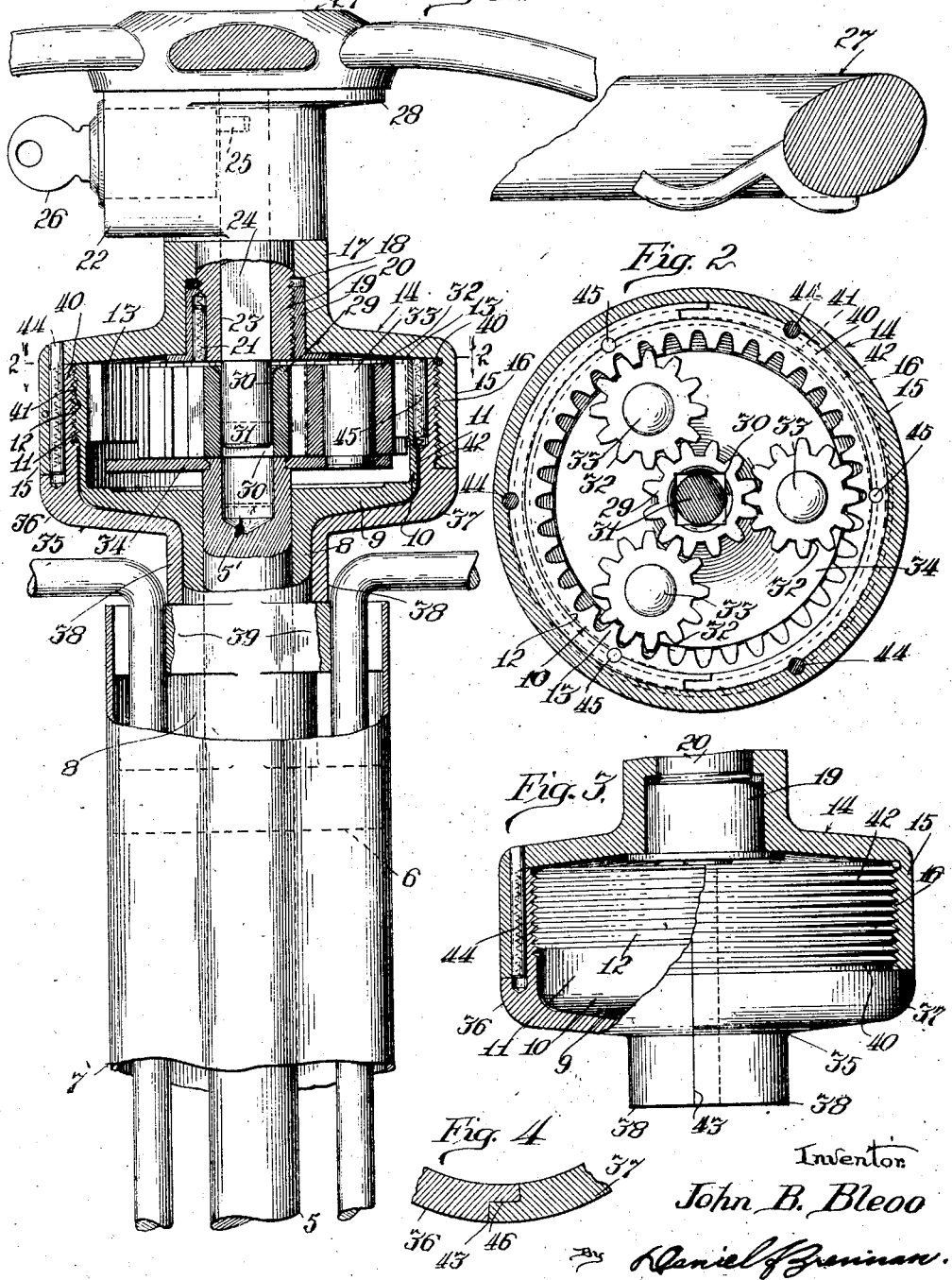

1,642,325

UNITED STATES PATENT OFFICE.

JOHN B. BLEOO, OF CHICAGO, ILLINOIS.

LOCK.

Application filed January 16, 1922. Serial No. 529,774.

This invention relates to locks, such as automobile and other vehicle locks, and more particularly pertains to a new and improved housing for the lock for preventing unauthorized access to the mechanism thereof.

While this invention, for the purpose of convenience, is illustrated as applied to a housing for the locking mechanism of an automobile steering wheel, wherein the wheel is released from the steering post to prevent theft, it will be readily appreciated that it finds a wide field of utility for other purposes.
Among the more important objects and general advantages of this invention are: the provision of an improved unit steering wheel, lock, and mechanism for connecting the device to a vehicle steering post, together with an improved housing construction for the latter; the provision of means for preventing unauthorized access to the locking and connecting mechanism; the provision of means for completely and effectively housing the key controlled mechanism for connecting the steering wheel and steering post, whereby to prevent the connection of these latter elements when disconnected to prevent theft; the provision of means for preventing the disassembly or removal of the housing to gain access to the wheel and post connecting mechanism; and the provision of a generally improved, compact and substantial device embodying the features pointed out.
More specifically, the device of this invention relates to and is designed as an improvement in the well-known type of automobile lock which releases steering wheel from the steering post by a key-controlled mechanism, the improvement hereinafter described relating particularly to a novel means for preventing manual connection of the key-controlled mechanism independently of the locking device, this being accomplished in some of these devices by opening the housing which encloses the connecting mechanism for the wheel and post, and thus connecting them, and enabling an unauthorized person to drive and steer the vehicle.
The improvement hereinafter described is particularly adapted for use on the type of steering wheel release shown, but is, of course, applicable to other types of connecting and disconnecting devices.
Such other objects and advantages as may be pointed out or appear hereinafter, are attained by the embodiment illustrated in the accompanying drawing, in which:

Figure 1 is a fragmentary elevational view, partly in section, illustrating one application of the device of this invention.

Figure 2 is a transverse section taken on the plane of line 2—2 of Fig. 1, looking in the direction indicated by the arrows.

Figure 3 is an elevational view of the protecting casing, partly in section.

Figure 4 is a fragmentary sectional view of a detail.

Referring more particularly to the drawing, the steering post, steering wheel, and locking mechanism therefor are shown in an assembly now used to a large extent on the type of automobile known as a Ford, and the lock mechanism to be presently described is one means for operatively connecting and disconnecting the steering wheel and steering post.

The steering post 5 is connected at its lower end to the steering mechanism (not shown), said post being rotatable in a bearing block 6, which latter is supported fixedly in the casing 7. The bearing block 6 has a sleeve 8 extending along the steering post and forming a bearing for the post and a support for the lower portion 9 of the housing 10. The lower portion 9 is substantially cup-shaped, and is provided with an up-standing annular flange 11, externally threaded at 12 and provided with a series of internal ring gear teeth 13.

The upper portion 14 of the housing takes the form of an inverted cup, and is provided with a depending annular flange 15, which is internally threaded at 16, said upper cup being larger in diameter than the lower cup and thus provides a space between the flanges, which are concentric and in the same plane. The cup 14 has an axial sleeve 17, provided with an enlarged annular shoulder 18, receiving an internally threaded bushing 19 for engagement with the lower threaded end of a trunnion 20, said trunnion and bushing being locked by case-hardened pin 21. The trunnion 20 and bushing 19 are revoluble in the sleeve 17, and the trunnion is an integral part of the lock housing 22. The trunnion has a longitudinal squared opening 23 therein, in which a bolt 24 slides, this bolt being connected to the pin 25 of the lock mechanism, not shown. A key 26 operates the lock mechanism. A steering wheel 27 is fixedly secured to the flange 28 formed on said lock housing 22. Motion is imparted from the steering wheel to the steering post 5 by a pinion 29 supported on the upper end of the post 5 and provided with a square opening 30 for receiving the bolt 24, said bolt having a cylindrical portion 31 which, as shown in Fig. 1, lies in the opening 30 when the wheel is released from the post. The pinion 29 is connected to the ring gear teeth 13 by a series of pinions 32, carried by trunnions 33 secured to a plate 34 mounted on the upper end of the post 5. The steering post has a recess 5' for receiving the cylindrical end of the bolt when depressed.

The protecting means comprises a cup-shaped shield element 35, formed in two half sections 36 and 37, and having complemental half sleeve portions 38—38 for embracing the sleeve 8, the lower margin of the sleeve formed by the sections 38 abutting a pair of diametrically disposed arms 39, formed on said sleeve 8. The shield 35 is provided with an upstanding annular flange 40, which is internally threaded at 41 for engagement with the threads 12 on the cup 9, and said flange 40 is externally threaded at 42 for engagement with the threads 16 on the cup 14. The shield sections 36 and 37 have each a shouldered joint as indicated at 43 in Figs. 3 and 4. A plurality of case-hardened steel pins 44 are inserted between the flanges 15 and 40, and another series of similar pins 45 are inserted between the flanges 40 and 11, thus effectively locking the cup sections 9 and 14 and the shield 35 against separation. The shield 35 is made in two sections to facilitate its attachment in proper position, and preferably is shouldered at 46 in order to afford a flush exterior surface.

From the foregoing it will be observed that any style of connecting mechanism for the steering wheel and post might be employed in lieu of that shown, and it will be seen that access to the interior of the housing 10 for operating the connecting mechanism independently of the lock is rendered possible only upon the complete destruction of the device.

The arms 39—39 serve to support the upper ends of the gas and ignition control levers 48 and 49 respectively, this being a conventional manner of controlling the type of automobile previously referred to.

While the control mechanism has been described somewhat in detail, this is merely to facilitate the disclosure of the subject matter of this invention, and, except in so far as the control mechanism effects the general combination afforded by this invention, I do not claim the control mechanism as my invention. I do, however, reserve the right to modify the structure disclosed for adaptation to various steering wheel locks within the purview of this invention and scope of the claims.

I claim:

1. In a device of the character described, the combination with a rotatable element, means for rotating said element, and key controlled means for operatively connecting said element and said means, of a two-part casing having its parts fixedly connected together for enclosing said connecting means, and a shield engaging said casing, and extending between the parts thereof for fixedly connecting the same.

2. In a device of the character described, the combination with a rotatable element, means for rotating said element, and key controlled means for operatively connecting said element and said means, of a two-part casing for enclosing said connecting means, and a shield encompassing one of the parts of said casing and fixedly engaging the other part of said casing.

3. In a device of the class described, in combination, a rotatable shaft, a wheel for rotating said shaft, key-controlled means for connecting said wheel and shaft, a housing completely enclosing said key-controlled means, and an auxiliary shield fixedly engaging, and substantially completely encompassing part of said housing for preventing access thereto.

4. In a device of the character described, in combination, a rotatable shaft, a wheel, means for connecting said wheel and shaft, a two-part housing enclosing said connecting means, and an auxiliary housing member fixedly connected to both of, and encompassing one, of the parts of said housing for preventing access to said connecting means.

5. In combination, a steering post, a steering wheel for operating said post, key-controlled means for operatively connecting said post and wheel, means for completely enclosing said key-controlled means, and means fixedly connected to and substantially completely encompassing a part of said second means.

6. In combination, a steering post, a steering wheel for operating said post, key-controlled means for operatively connecting said post and wheel, a housing for said key-controlled means comprising two complemental cup-shaped sections having each an annular flange, said flanges being in spaced relation, and a third cup-shaped member having an annular flange for reception between and in fixed connection with first said flanges.

7. In combination, a steering post, a steering wheel for operating said post, key-controlled means for operatively connecting said post and wheel, a housing for said key-controlled means comprising two complemental cup-shaped sections having each an annular flange, said flanges being in spaced relation, and means encompassing one of said sections and fixedly engaging both of the sections in the space therebetween for locking same.

8. In combination, a steering post, a steering wheel for operating said post, key-controlled means for operatively connecting said post and wheel, a housing for said key-controlled means comprising two complemental cup-shaped sections, one of said sections having an internally threaded flange and the other section having an externally threaded flange presented toward each other, and a third cup-shaped section encompassing one of said first sections and having a threaded flange for engagement with the threads on both of said flanges on said first mentioned sections.

9. In combination, a steering post, a steering wheel for operating said post, key-controlled means for operatively connecting said post and wheel, a housing for said key-controlled means comprising a cup-shaped section provided with an internally threaded flange, and a second cup-shaped section provided with an externally threaded flange lying within and in spaced relationship to the first-mentioned flange, and means adapted for insertion between and for engagement with the threads on both of the flanges for locking same.

10. In combination, a housing comprising a pair of opposed cup-shaped elements having concentric spaced flanges, said flanges having opposed threads, and a third cup-shaped element having an annular internally and externally threaded flange adapted for threaded engagement with the threads on said first-mentioned flanges.

11. In combination, a steering post, a steering wheel for operating said post, key-controlled means for operatively connecting said post and wheel, a housing for said key-controlled means comprising a cup-shaped section provided with an internally threaded flange, and a second cup-shaped section provided with an externally threaded flange lying within and in spaced relationship to the first-mentioned flange, and a third cup-shaped element having an annular flange threaded for engagement with both of first mentioned flanges.

12. In combination, a housing comprising a cup-shaped portion having an annular flange, and a second cup-shaped portion having an annular flange disposed in spaced relation within the first-mentioned flange, said flanges having opposed screw-threads, and a third cup-shaped portion, having an annular internally and externally threaded flange disposed between said first flanges and engaging the threads thereof.

13. In combination, a housing comprising a cup-shaped portion having an annular flange, and a second cup-shaped portion having an annular flange disposed in spaced relation within the first-mentioned flange, said flanges having opposed screw-threads, and a third cup-shaped portion, formed in two parts, and having an annular internally and externally threaded flange disposed between said first flanges and engaging the threads thereof.

14. In combination, a housing comprising a cup-shaped portion having an annular flange, and a second cup-shaped portion having an annular flange disposed in spaced relation within the first-mentioned flange, said flanges having opposed screw-threads, a third cup-shaped portion encompassing the smaller of said first-mentioned cup portions, and an annular flange on the third cup for threaded engagement with the flanges on the first-mentioned cups.

15. In combination, a housing comprising a cup-shaped portion having an annular flange, and a second cup-shaped portion having an annular flange disposed in spaced relation within the first-mentioned flange, said flanges having opposed screw-threads, a third cup-shaped portion encompassing the smaller of said first-mentioned cup portions, an annular flange on the third cup for threaded engagement with the flanges on the first-mentioned cups, and means for fixedly interlocking said flanges.

16. In a device of the character described, in combination, a steering shaft, a steering wheel for connection with said shaft, key-controlled means for operatively connecting said wheel and shaft, a housing comprising a cup-shaped portion having an annular flange, and a second cup-shaped portion having an annular flange disposed in spaced relation within the first-mentioned flange, said flanges having opposed screw-threads, and a third cup-shaped portion, having an annular internally and externally threaded flange disposed between said first flanges and engaging the threads thereof.

17. In combination, a steering post, a steering wheel for operating said post, key-controlled means for operatively connecting said post and wheel, a housing for said key-controlled means comprising two complemental cup-shaped sections having each an annular flange, said flanges being in spaced relation, and means encompassing the smaller only of said sections and fixedly engaged with both of said sections in said space.

18. In a device of the character described, in combination a casing comprising opposed sections of different sizes provided with concentric flanges in spaced relationship, and a retaining section for said casing enclosing one of said sections and having a flange for reception between and fixed engagement with said first mentioned flanges.

19. The combination with a housing cover adapted to fit over and cover the housing of the planetary gearing of a steering gear; of a divided bottom member fitted within the lower end of said housing cover.

20. The combination with a housing cover adapted to fit over and close the housing of a planetary gearing, of a retaining element between and in threaded connection with and serving to prevent the insertion of an object between said housing and cover.

21. The combination with a housing containing connectible elements, a cap on said housing, and a divided abutment member engaging one end of said housing and in engagement with said cap.

In testimony whereof, I affix my signature at 36 W. Randolph St., Chicago, Illinois.

JOHN B. BLEOO.